Jan. 30, 1934.  H. A. BRASSERT  1,945,342
APPARATUS FOR PRODUCING LOW CARBON METALS
Filed Sept. 13, 1932    2 Sheets-Sheet 1
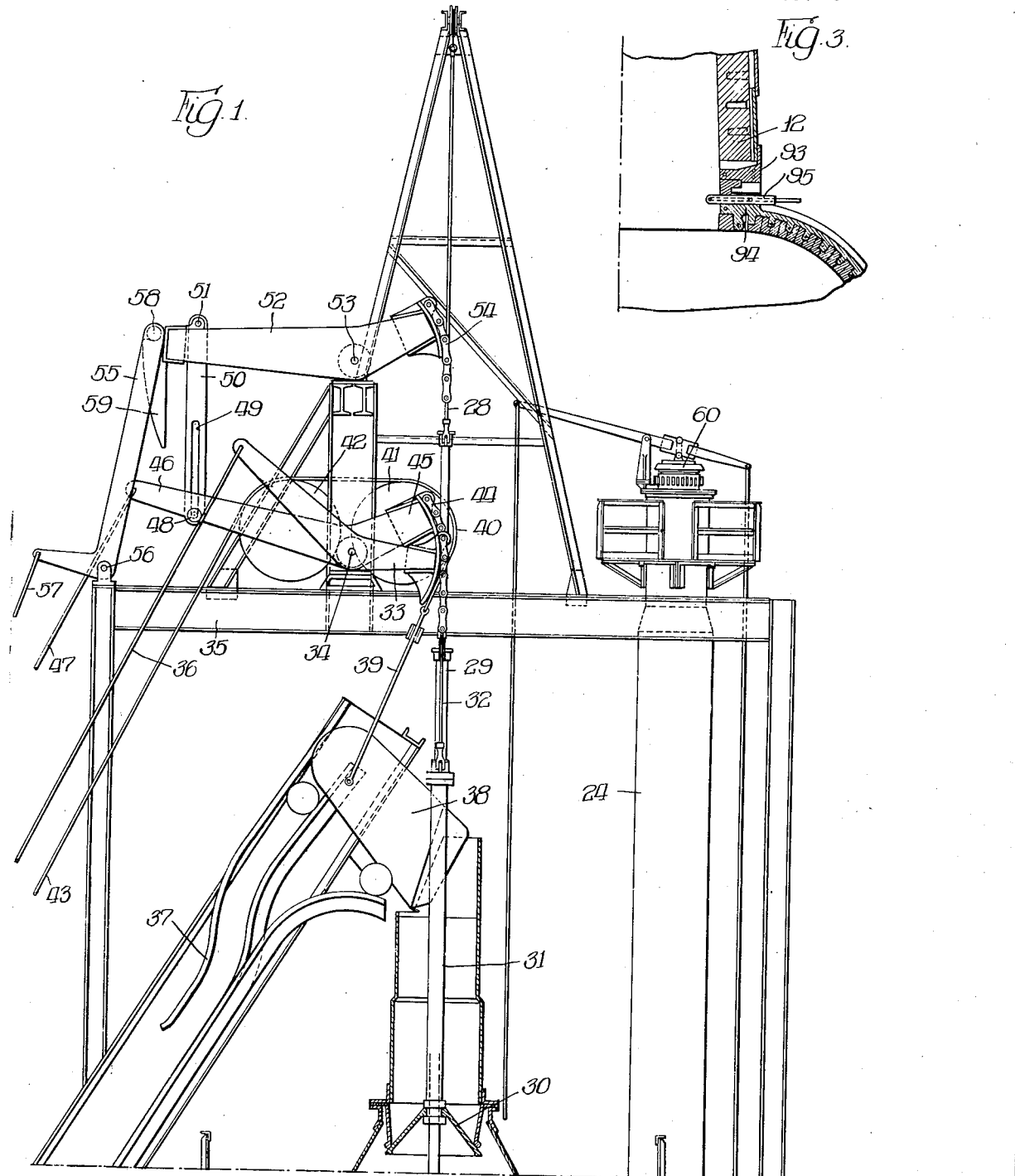
Inventor:
Herman A. Brassert,
By Wilkinson, Huxley, Byron & Knight attys

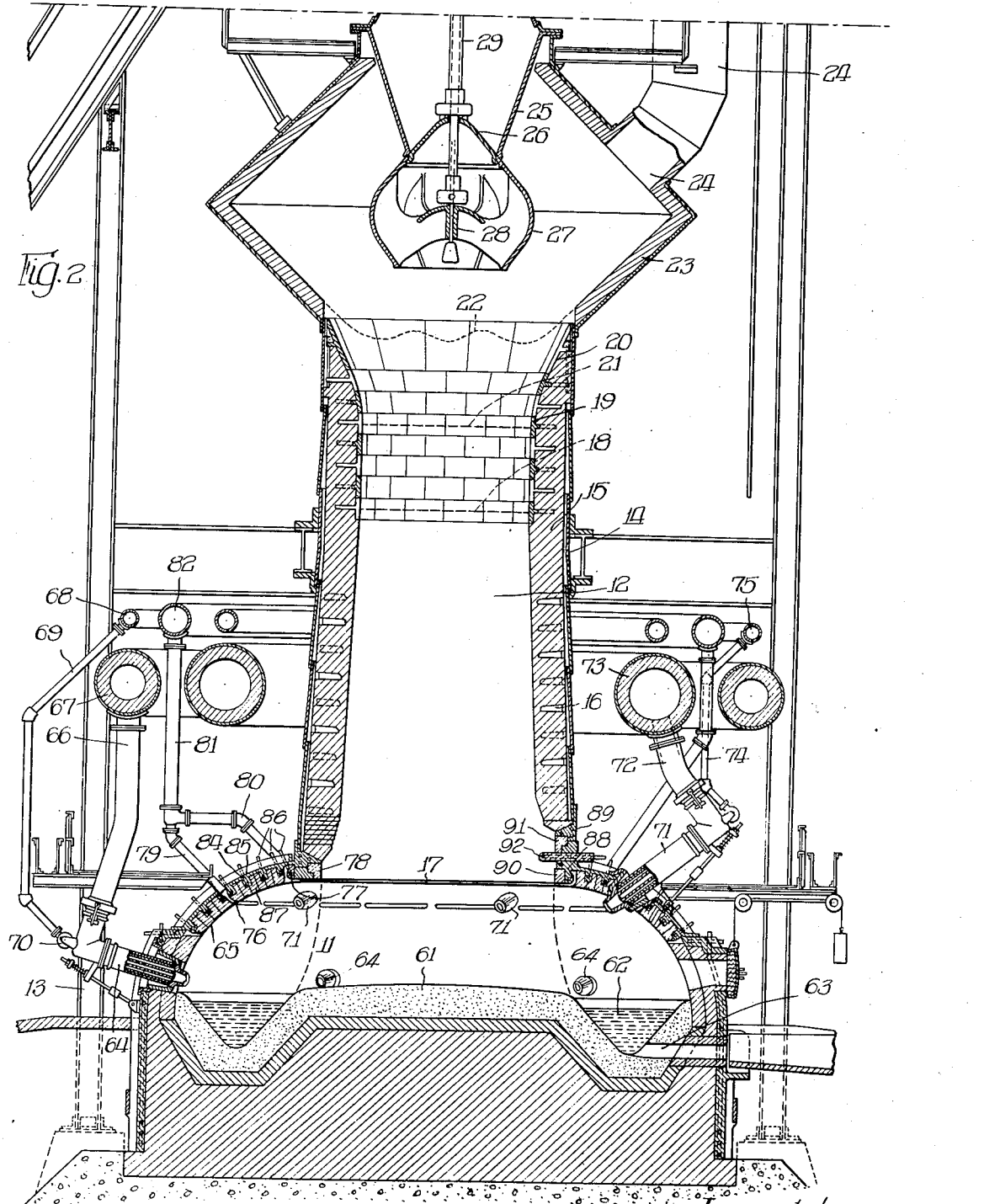

Patented Jan. 30, 1934

1,945,342

UNITED STATES PATENT OFFICE 1,945,342

APPARATUS FOR PRODUCING LOW CARBON METALS

Herman A. Brassert, Chicago, Ill., assignor to H. A. Brassert & Company, Chicago, Ill., a corporation of Illinois Application September 13, 1932
Serial No. 632,988

3 Claims. (Cl. 266—24)

This invention relates to a new and improved apparatus for the purpose of producing low carbon metal of pure quality directly from ores and scrap without permitting the metal to become carbonized as in present blast furnace practice. The refining of the metal to steel may be carried on in the same furnace or existing open hearths or electric furnaces may be used for the finishing operation. The fuel used is finely divided carbon in the shape of coke or coal screenings for reduction, and powdered fuel, oil or gas for melting and refining. The preferred metallic burden would consist of iron ores and scrap in the proportions usually consumed by modern steel plants in their blast furnaces and open hearths. This method, therefore, obviates the charging of cold scrap into the open hearth.

The fuel consumption per ton of metal is materially less than in combined blast furnace and open hearth practice, and the product is a metal low in carbon, very free from sulphur and oxides and much better suited for finishing in the open hearth than Bessemer blown metal.

One of the objects of the process for which this apparatus is suitable is to preserve the original manganese content of the ore charge. In the present duplex method where the iron is blown in a Bessemer convertor the manganese is lost during the blow through oxidation and an overoxidized metal without the protecting presence of manganese is charged into the open hearth furnace for refining and finishing. The lack of manganese is a serious objection to the duplex process and in order to make a high quality of steel, additional manganese in the form of manganese or spiegel or ferro must in many cases be added to the open hearth bath in order to produce a metal free from oxides, such manganese being in excess of those added to the bath or the ladle at the finish. It is possible with the proposed method to add sufficient manganese to the top charge to replace a substantial amount of the final ferro additions, resulting in an important saving. This method of adding the manganese has the advantage that low grade manganiferous ores can be used in place of rich ores or ferro manganese and also that the manganese is reduced and preheated to a high degree before entering the bath.

Metallurgical coke is not required as almost any fuels can be used. Small coke and coke fines are most suitable and therefore non-coking coals or such of poor coking quality become available for iron and steel making. In new enterprises, the proposed furnace with its accessories may take the place of coke ovens, blast furnaces, and in part Bessemer and open hearths, reducing the major operation of producing low carbon metal to one process and reducing the investment cost per ton of product to a fraction of the present figure.

The first object of this process is to avoid the saturation of the iron with carbon, as occurs to a specially high degree in our modern blast furnaces in which a large more or less inert cone of coke rests on the bottom of the hearth and extends upward into the shaft of the furnace, causing complete saturation of the metal with carbon by its long contact with this coke mass. This carbon has to be removed in the subsequent steel making process at a large expense of time, fuel and labor, as well as capital expense on account of the excessive apparatus required. Furthermore, in the blast furnace, and again especially in the modern type with its exaggerated large hearth diameter, an increasing percentage of the ore passes through an oxidizing zone which exists in front of the tuyères, with deleterious effect on the quality of the iron.

In a preferred method of operation of the proposed shaft furnace, fine ores are mixed with finely divided fuel and charged against the walls and the coarser ore, sinter and scrap, with a small percentage of coarser fuel and flux, is placed in the center. This preferential division of material has the purpose of preventing the gases from flowing up on the walls by compelling them to sweep up through the more open center. There they perform the duty of preheating the coarser materials, calcining the flux and supporting the reduction of the lumpy ores. In this way the tendency of the gases to travel along the walls with resulting economic losses and overheating of the wall regions is counteracted. The mixture of fine ores and carbon is allowed to preheat gradually as it travels through the progressive zones of temperature required for gasification of the carbon of the fuel to CO in contact with the oxygen of the ore and for the immediately following reduction of the oxides by this CO in a highly reactive state due to its "status nascendi". This reaction is practically exothermic and therefore not much heat is required in the section adjacent the wall. The efficiency of this reduction process is well known from numerous and extensive experiments. The intimate mixture of carbon fines with iron oxides greatly accelerates reduction and permits reduction to be completed in a fraction of the time and therefore in a short column, as compared with the blast furnace. The carbon used is cheaper than blast furnace coke. The amount of carbon added to the ore must, in most cases, be in excess of the amount required for direct reduction in order to furnish the carbon required to bring the carbon dioxide back to carbon monoxide as it leaves the annular combustion space to enter the lower end of the shaft. This being an endothermic reaction helps to reduce the temperature in the shaft and maintains the reducing atmosphere in the melting column which is desirable in most cases.

The heat required for melting is provided by a more efficient method than the combustion of coke to CO at the tuyères of a blast furnace. My improved furnace is designed with a hearth developed to contain a combustion chamber which permits the injection and complete combustion of external fuel, such as powdered fuel, oil or gas. The combustion can be complete because it takes place in a large annular combustion chamber in which a full flame development is permitted. In the blast furnace, on the other hand, combustion is incomplete, because it takes place in a restricted area in the presence of an excess of carbon, although an oxidizing zone exists in the immediate vicinity of the tuyères. For the reason of lack of combustion space, attempts to inject fuel through the tuyères of a blast furnace have always met with failure.

Compared to temperature conditions in the hearth of a blast furnace, my improved furnace will work at substantially higher temperatures or under a much greater heat head, the theoretical flame temperature from the complete combustion of powdered coal being approximately 1,000 degrees higher. For instance, with the air preheated to 2,000° F. as is proposed, and with a good grade of powdered coal, the theoretical flame temperature is approximately 4200° F.

From the viewpoint of an open hearth furnace, the proposed furnace has the advantage of better flame control, the fuel being injected through one or more rows of multiple tuyères uniformly spaced around the hearth and playing directly on the melting column and the molten bath respectively, whereas in the open hearth the flame may be applied at one end of a long bath only and its development and proximity to the surface of the bath are difficult to control. The waste gases in the open hearth are used for regeneration of the air and gas and flow directly into the checkerwork of the regenerators, laden with oxides, fumes and dust which rapidly fill up the checkers and progressively decrease the economy of the process during the furnace campaign until the checkers are replaced. In my improved furnace the heat of the waste gases is utilized directly in the process, for reducing and preheating the charges so that they will arrive in the hearth in a highly preheated state, avoiding the irrational method practiced in the open hearth of charging large amounts of cold materials into a white hot bath.

The top gases from my improved furnace, after giving off most of their heat to the descending charges, are cleaned and applied to a modern hot blast stove with zoned checkers for preheating the air used in combustion of the powdered fuel, oil or gas. Compared to the usual open hearth regenerator such stoves operate at an extremely high efficiency, an improvement over former practice which has been made possible by the use of clean gas. Stoves of this type last for many years and their use with the furnace will obviate the present high repair and maintenance cost of the open hearth regenerator.

My furnace permits of control of the process of melting and refining through positive regulation of the fuel and air ratio at any moment of the operation. Such regulation is difficult to obtain in the open hearth furnace owing to the short reversal periods. In the proposed furnace there is no reversal, the reversal taking place outside of the furnace in the hot blast stoves. This is a fundamental improvement over the present open hearth method.

The hearth of the furnace is provided with an annular recess adjacent to its walls for receiving and holding the molten metal as it trickles down off the face of the melting stock column. The upper tuyères are placed more nearly radially, whereas the lower tuyères are arranged tangentially and inclined so as to impinge the flames directly on the bath. In this manner the most direct contact between flame and bath is obtained. By increasing the speed of the flames, the bath can be given a rotary motion, exposing new surfaces to the action of the flames, thereby accelerating the refining reactions.

The process is preferably carried on continuously or may be operated intermittently. If carried on continuously the melting is preferably done with a neutral or oven reducing flame, which latter method becomes possible owing to the high temperature and the concentrated flame effect. If reducing, melting and refining is carried out in a reducing gas phase throughout, an extraordinary high quality of steel will result. In that case the analysis of the metal is controlled by varying the fuel to ore ratio in the top charges and the melting atmosphere in the hearth. Additions may be made, if necessary, through doors provided for that purpose. The time of charges in the furnace from top to melt and their metallic weight corresponds to the time and weight of each heat tapped, so that changes in burden are effective in less than two hours and the quality of each heat can be regulated by altering the charge in accordance with the results of the preceding heat.

A more basic slag is used in this process than blast furnace or oven open hearth slags. The fact that the lime is charged in the center and the higher temperatures in the hearth make this possible. The superheated and basic slag will have great desulphurizing power. It can be withdrawn continuously through an open cinder notch, leaving a thin layer on top of the annular bath.

The bath is substantially V-shaped in cross section in order that it should present a large metal surface with the thinnest possible covering of slag for a given slag volume. This also results in the largest contact area for interfacial reactions between the metal and the slag.

If dephosphorization is desired in the shaft furnace operation, an oxidizing flame would be used and under its influence an in the presence of unreduced oxides descending through the center of the stack, a basic oxidizing slag will result which will absorb the phosphorus from the metal. This slag may be run off continuously through the open cinder notch during the melting period. Due to the comparatively large volume of slag, the phosphorus elimination by this means can be carried on without difficulty. It is possible in the absence of carbon and with a high temperature head and high lime content of slag to finally remove the phosphorus without entailing iron losses through the use of a slag high in iron oxide. In other words, iron oxides can be replaced by lime, even to a greater extent than in the electric furnace.

This process is also particularly suited for the production of ferromanganese, ferrosilicon and other alloys, particularly those which like manganese and silicon can only be reduced by direct contact with carbon and CO at high temperatures. In the blast furnace manganese ore and siliceous ore are reduced and the metals smelted by the use of metallurgical coke. As the manganese or respectively the silicon trickle past the tuyères they are oxidized and volatilized in contact with the hot blast in the tuyère zone and a substantial amount of the total elements contained in the charge is lost. In the case of ferromanganese production the loss in the tuyère zone generally represents half the total loss. In other words, it is as great as the loss of manganese in the slag.

In the case of ferrosilicon there is also a substantial loss and in both cases the presence of metal fumes in the gases presents the most difficult problem of the cleaning of the gases so they may be used economically in hot blast stoves and under boilers.

My process largely overcomes this difficulty as the reduced ore descending from the shaft does not come in contact with an air blast but descends into the hearth mixed with sufficient excess carbon beyond that required for reduction, to reduce the $CO_2$ in the gases of combustion to CO and protect the metals from becoming oxidized. The exceedingly high temperatures existing in my hearth establish a preponderant affinity of the oxygen for the carbon rather than for the metals.

In the case of producing manganese the process has the additional advantage that very basic slags can be carried, thereby further reducing the manganese losses, in fact the manganese loss can be held to a minimum. In the case of producing ferro-silicon highly acid slags can be used without saturating the metal with an excessive amount of sulphur, the sulphur content of the metal being controlled by the high temperatures prevailing in the hearth which is not possible in the blast furnace.

For the production of lead from lead ores and copper matt from copper ores, the process has very definite advantages over present methods. The process is suited to the use of both coarse and fine ores and also to the use of fuels which are more readily available and cheaper than metallurgical coke. In the melting of lead the proposed furnace has the advantage over the usual methods that it presents a very large surface for the separation of the metal from the slag, thereby reducing lead losses in the slag. It also has the advantage in the smelting of any metals of much more accurate temperature control than is possible with existing furnaces, as well as control of the reducing and melting atmosphere. It permits the lead and copper processes to be carried on within a higher range of temperature than by present methods, thereby accelerating the process and increasing the unit production. Oxidation losses are also decreased for the same reason mentioned in connection with steel and ferrous metal production.

It is an object of the present invention to provide a new and improved furnace for the production of metals directly from ores, and particularly of low carbon metal from iron ore.

It is an additional object to provide a furnace having a charging system for controlling the distribution of the charge in the shaft portion of the furnace.

It is also an object to provide a furnace having a shaft portion discharging by gravity through an unrestricted opening into a hearth of materially greater diameter than the shaft.

It is a further object to provide a furnace having an annular combustion chamber surrounding the lower portion of the descending column of stock.

It is an additional object to provide a furnace having an annular bath surrounding the column of material and substantially out of contact with the material, the bath being preferably of substantially wide V-shaped cross section to afford wide contact between the slag and metal.

It is also an object to provide a furnace having a raised hearth center for supporting the descending column of material above the level of the surrounding molten metal in the bath.

It is a further object to provide a furnace in which the area of the shaft portion, the area of the raised hearth below the shaft portion and the height between the raised hearth portion and the lower end of the shaft portion are so proportioned as to maintain the column of material supported substantially clear of the encircling bath of molten metal.

It is an additional object to provide a furnace construction in which means are provided at the junction of the shaft and hearth portions to reduce or substantially eliminate wearing away of the wall at this point.

It is another object to provide a construction having movable means at the junction of the shaft and hearth portions whereby the furnace area at that point may be selectively reduced.

It is also an object to provide a furnace having a plurality of rows or series of tuyères provided with independent bustle pipes whereby the different sets of tuyères may be operated independently of each other.

It is a further object to provide a furnace in which the dome may be water cooled and in addition provided with means for introducing cooling gases to flow along adjacent the inner surface of the dome or roof and also to cool the knuckle joint at the intersection of the shaft and hearth portion of the furnace.

It is an object to provide an apparatus for the production of low carbon metal directly from the ores with or without the addition of material quantities of scrap.

It is a further object to provide an apparatus which may be operated continuously or intermittently.

It is also an object to provide an apparatus in which the melting stock column and bath of molten metal may be treated independently in a single unitary furnace.

It is an additional object to provide an apparatus in which a highly basic slag is used and in which the molten metal reaches the bath with a low carbon content whereby phosphorus may be removed without a slag high in iron oxides.

It is a further object to provide an apparatus in which the fuel necessary for combustion is injected into the furnace through tuyères and not charged with the stock.

It is also an object to provide an apparatus in which carbon for direct reduction is charged with the stock and in which a reducing atmosphere is carried in the stack portion of the furnace.

It is an object of the invention to provide an apparatus using fuel other than metallurgical coke for the reduction of ore and for the melting of the metal and slag.

It is a further object to provide an apparatus in which a portion of the ore is reduced directly in contact with carbon mixed with the charge and another portion of the ore reduced with CO gases generated at the bottom of the stack from carbon injected into the hearth.

It is an additional object to provide an apparatus in which a portion of the ore is reduced directly in contact with carbon mixed with the charge and another portion of the ore reduced in CO gases generated partly from fuel injected into the hearth and partly from carbon mixed with the charge.

It is also an object of the invention to provide an apparatus which permits heating the hearth of a reducing furnace by complete combustion of external fuel injected into said hearth and subsequently reducing the products of such complete combustion with highly preheated carbon descending through a shaft with the charge.

It is a further object to produce a low carbon ferrous metal for duplexing, containing a substantial amount of the original manganese content of the charge.

It is an additional object to produce a low carbon ferrous metal from iron ore with or without the addition of scrap in the charge in the absence of an oxidizing blast for refinement in a subsequent steel finishing furnace.

It is a further object of the invention to provide an apparatus whereby through the attainment of high hearth temperatures created by injected fuel brought to complete combustion, a highly basic slag may be used containing in excess of 56% of CaO plus MgO, whereby metal very low in sulphur is produced.

It is also an object to produce a ferromanganese direct from manganese ores without the use of metallurgical coke.

It is an additional object to produce ferromanganese direct from manganese ores using as a fuel, partly finely divided carbon with or without coke mixed with the charge, and partly fuel injected into the furnace.

It is also an object to produce a ferromanganese with low carbon content directly from ores, said carbon content being less than two percent.

It is also an object to provide means for producing ferromanganese directly from manganiferous ores by exposing said ores to the reducing atmospheres throughout the process, thereby largely preventing loss of manganese through oxidation.

It is also an object to produce a ferrosilicon direct from silicon ores without the use of metallurgical coke.

It is an additional object to produce ferrosilicon direct from silicon ores using as a fuel, partly finely divided carbon with or without coke mixed with the charge, and partly fuel injected into the furnace.

It is also an object to produce a ferrosilicon with the low carbon content directly from ores, said carbon content being less than two percent.

It is also an object to provide means for production of ferrosilicon directly from ores by exposing said ores to the reducing atmospheres throughout the process, thereby largely preventing loss of silicon through oxidation.

Another object of my invention is to provide a support for a column of preheated stock to be melted, said support consisting of a substantially horizontal refractory wall of sufficient area and width to retain the melting materials in accordance with their natural angle of repose so that under the influence of a blow torch flame directed against the sloping surface of the melting column the molten liquid material only will run off the supporting refractory wall, whereas the solid center of the column will continue to rest thereon.

A further object of the invention is to provide means for controlling the speed of descent of reduced and preheated materials from a shaft into a melting hearth.

Another object of my invention is to provide a backwall for a melting hearth having a slope substantially flatter than the angle of repose of the materials, said slope functioning as a support for preheated materials descending through a vertical shaft connected with said hearth.

Another object of my invention is to connect a melting and refining hearth with a vertical shaft of such form and in such a manner that the contour and the width of the opening of the shaft at its lower end will retard and facilitate the control of the movement of the materials from the shaft into the hearth without causing these materials to hang up in the shaft furnace.

Other and further objects will appear as the description proceeds.

I have shown a preferred embodiment of my improved furnace in the accompanying drawings, in which—

Figure 1 is an elevation of the upper part of the furnace;

Figure 2 is a vertical section of the lower part of the furnace, Figure 2 joining on immediately at the lower edge of Figure 1; and Figure 3 is a fragmentary section showing a modified form of construction of the knuckle joint at the juncture of the lower end of the shaft and upper edge of the hearth.

Referring first to Figure 2, the furnace is provided with a lower hearth portion 11 and with an upper independently supported shaft portion 12, this shaft portion being carried by a steel frame work indicated generally at 13. The shaft portion is provided with an outer metal wall 14 and with an inner lining 15 of refractory brick. A plurality of water cooled plates 16 are preferably provided for cooling and maintaining the refractory lining in the lower portion of the furnace. It will be observed that this lower portion inclines outwardly so that the line 17 where the shaft discharged into the hearth is of materially greater area than the upper portion on the line 18.

The upper portion of the furnace is provided with a plurality of metal plates 19 which protect the refractory lining against the action of the stock charged into the upper end of the furnace. The inner surface of the lining and of the wear plates flares outwardly as shown at 20, above the line 21. This outward flare is located below the normal stock line which has been indicated in broken lines at 22. The furnace top 23 above the stock line also flares outwardly so as to provide a large area for the gases leading to the offtakes 24. This flaring arrangement of the furnace below the stock line causes an increased area at the top of the stock which reduces the gas velocity in the upper layers of the stock and thereby minimizes the carrying of dust from the stock. The large area in the flaring portion 23 further reduces the gas velocity so as to cause dust carried from the stock to drop back upon it.

The charging hopper 25 is closed at its lower end by a composite bell having a small upper section 26 and a large lower section 27. The section 27 is carried on the rod 28 while the upper section 26 is carried on the tube 29. It will be noted that the lower section 27 is hollow and when the upper section 26 is dropped and the lower section 27 maintained in its position as shown in Figure 2, material from the hopper 25 will discharge from section 26 against the inside of section 27 which will direct it toward the center of the furnace. When both sections are dropped together, material will flow over the outer surfaces of both sections and will thereby be directed toward the face of the flaring furnace lining shown at 20.

The bell operating and charging mechanisms are shown in Figure 1. The upper bell 30 is carried by the tube 31, which is suspended by rods 32 from the bell crank lever 33, which is pivoted at 34 upon a support carried by the supporting framework 35. This bell crank 33 is operated by the cable 36. The charging skip track is shown at 37 with the charging skip 38 connected by the bail 39 to the cable 40 passing over the sheaves 41 and 42 to the downwardly extending cable portion 43.

The tube 29 which is connected to the upper section 26 of the large bell is connected by the chain links 44 to the bell crank 45 which is shown as pivotally supported on the same axis 34 as the bell crank 33. The outer arm 46 of the bell crank 45 is provided with an operating cable 47. This arm 46 also carries a pin 48 which operates in the slot 49 formed in the link 50 which is pivotally supported at 51 on the upper bell crank 52. This bell crank 52 is pivotally supported at 53 and its short arm has connected thereto the chain cable 54 which is connected in turn to rod 28 which operates the lower section 27 of the large bell. The latch bell crank 55 is pivotally supported at 56 on the framework and has an operating cable 57 secured to its short arm. This latch bell crank is provided with a cross pin 58 carried at its upper end which, as shown in Figure 1, rests in a notch formed in the upper end of the detent member 59 carried by the outer end of the bell crank 52. The offtake 24 is shown with a usual type of bleeder valve at 60.

The operation of the small bell 30 by means of the bell crank 33 and its operating cable 36 will be obvious. If both sections 26 and 27 of the large bell are to be simultaneously lowered, the detent cross bar 58 is swung to the left by a downward pull on the cable 57 which swings the bell crank 55 in the counterclockwise direction. A release then of the cable 47 permits the bell crank 45 to swing in the clockwise direction to lower the upper section 26 of the bell and the connecting link 50 permits the bell crank 52 to similarly move in the same direction. Both bell sections are raised together by a downward pull on the cable 47. If the upper large bell section 26 is to be lowered along, the detent cross bar 58 is permitted to remain in its position in Figure 1, and the cable 47 is slacked. In this case, the bell crank 45 swings in the clockwise direction to lower the bell 26, but the bell crank 52 is restrained against movement by the cross bar 58 fitting in the notch in the member 59.

The pin 48 carried by bell crank 45 moves freely in the slot 49 in the connecting link 50.

The lower or hearth portion of the furnace is provided with a raised central hearth section 61 which serves to support the bottom of the column of material which extends from the shaft portion 12 into the hearth portion 11. The V-shaped bath of metal 62 entirely surrounds the raised hearth portion 61. This bath is V-shaped in cross section in order to give a wide contact surface between the metal and the slag thereon. A metal tapping hole is shown at 63.

A lower series of tuyères 64 is shown as extending through the dome-shaped roof 65. These tuyères 64 are connected by pipes 66 to the bustle pipe 67. This bustle pipe 67 is adapted to carry a hot blast of air to the tuyères. The main 68 is adapted to carry gas or other fuel and is connected by pipe 69 to the rear end of the tuyère at 70. An upper set of tuyères 71 extend into the hearth through the roof 65 and are connected by pipes 72 to the bustle pipe 73, this pipe serving to carry a hot blast of air to the tuyères. These tuyères 71 are connected by the pipe 74 to the fuel main 75. A plurality of cooling slots or openings 76 and 77 are located in the roof of the hearth section, the slots 77 being located closely adjacent the knuckle joint at 78. These slots 76 and 77 are connected by pipes 79 and 80 to the pipe 81 which connects to the cooling gas main 82. The slots 76 and 77 may extend continuously around the dome as shown in Figure 2. The furnace dome or roof 65 is preferably made up of a plurality of sections having metallic outer portions 83 with inwardly extending metallic fins 84 provided with water cooling passages 85. The water cooling connections have been shown at 86. The refractory brick 87 are held between the water cooled extensions 84.

The upper ends of the metallic roof sections are supported by a continuous metallic key ring 88, which is also preferably water cooled as shown in the drawings. The lower end of the shaft portion 12 is supported by water cooled metallic ring 89 independently of the hearth portion. These metallic rings 88 and 89 are shown as carrying refractory brick facings 90 and 91.

In the form of construction shown in Figure 2, these rings are set back with their facings so as to give a somewhat enlarged area to the lower end of the stack. A plurality of water cooled slide members 92 are provided, these members closing the space between the refractory carried by the ring 89 and the ring 88. These members 92 may be of wedge-shape or such other shape as to permit a part of them to be moved inwardly of the shaft, as shown in Figure 2, so as to selectively reduce the effective passage area both for material from the shaft and for gases flowing from the hearth. These members 92 may be withdrawn so as to bring them within the contour of the water cooled rings and refractories to give a maximum discharge area to the stack.

The form of construction shown in Figure 3 is similar to that just described in connection with Figure 2, with the exception that the ring 93 and hearth ring 94 extend outwardly to the plane of the inner refractory lining of the shaft section 12. The slide members 95 may be moved inwardly or outwardly to further restrict the opening at the lower end of the stack.

In the use of the furnaces of the types shown and described to carry out my improved process, when the bath has become filled with metal, melting may be practically stopped by discontinuing the flame through the upper burners and applying a reducing flame through the lower burners during which period a basic reducing slag is formed. The gas volume created by combustion during refining will be only a fraction of that generated during melting. The refining flame being directed tangentially against the bath, their focus of heat is quite far removed from the opening of the shaft so that melting in the center of the hearth is practically stopped during this period, the heat of combustion being largely consumed by its transfer to the bath. In the reducing atmosphere then existing the combustion of carbon descending in the shaft which was not consumed in reduction will also stop. If necessary, the gases or a portion thereof may be withdrawn during refining through certain of the upper melting tuyères.

The refining period after removal of the basic oxidizing slag will occupy about one hour. Doors are provided for adding lime, fluor-spar, manganese or other additions to the bath during the refining period, or such materials may be blown in through the tuyères. Metal and final slag are removed when tapping the furnace, which is equipped with blast furnace tapping and stopping devices so that a minimum of time is lost between refining and resumption of the next melting period.

In many cases on account of existing equipment it will be more economical to carry on the final refining in the open hearth or electric furnace. This permits the shaft furnace to run continuously as a melter, desulphurizer or dephosphorizer, and continuous operation may have advantages and economies which offset the cost of a secondary refining operation in a separate furnace. For instance, the shaft furnace could deliver a heat of low silicon, low carbon and low sulphur to the open hearth or a heat of low phosphorus, low carbon to the electric furnace, requiring only a small fraction of the time now consumed in these processes for the final refining.

The operation of the furnace may be started by heating the hearth and burning in the bottom, then filling the stack with the regular charges, allowing the materials to rest on the bottom. After the stack is filled with materials the injection of fuel with hot air through the upper tuyères commences. The flames playing directly on and all around the exposed stock column at extremely high temperatures will rapidly melt away the column of reduced ore and scrap resting on the bottom, and in melting away will allow other materials to continually descend from the shaft. Charging at the top is continuous as long as melting proceeds. The molten metal trickles over the face of the melting stock column and gathers in the annular bath surrounding the melting stock which acts as a backwall to the annular hearth.

When the hearth becomes filled with metal of the desired analysis, it is tapped. After tapping, melting proceeds immediately. Needed repairs may be made to the bottom in the manner usual to open hearth practice, between heats, such repairs being facilitated by the proximity of the bath to the periphery of the furnace.

The productive capacity of the unit is very large. A furnace with a 10' throat, a 12' bosh and 31' hearth diameter, as shown in Figures 1 and 2, is estimated to produce 600 tons of low carbon metal per day from a charge in which 60% of the metal is derived from ore and 40% from scrap.

The shaft is carried independent of the hearth on a steel structure and the joint between the dome of the hearth and the lower shaft ring is packed with fireproof material and water cooled on both faces. This joint may be horizontal or at an angle to facilitate withdrawal or moving in or out of the water cooled metallic ring segments or of highly refractory segments which form the lower inner edge of the shaft lining. By moving these segments in or out, the flow of materials from the shaft into the hearth may be retarded or accelerated. The dome is also intensely water cooled and is lined with special high temperature brick. In addition provision has been made for admitting cooling gases, preferably chimney gases from hot blast stoves, to the underside of the dome and the knuckle joint. The ducts provided for this purpose may also be used for withdrawing gases when it is not desired to pass such gases through the stock.

The main features of the furnace are the charging system on top for controlling distribution, the unrestricted opening at the bottom of the shaft into a hearth of much larger diameter, resulting in an annular combustion chamber surrounding the melting stock, the raised central portion of the bottom for carrying the melting stock column which is wider than the lower end of the shaft portion, so that it may substantially prevent masses of descending materials falling over into the bath, and the depressed annular hearth for holding the bath; also the radially and tangentially placed tuyères preferably in separate superimposed rows with separate bustle pipes for air and fuel lines for controlling the conditions of combustion during melting and refining.

While I have shown and described certain preferred embodiments of furnaces and various methods of carrying out my improved processes, these are to be understood as illustrative only, as both furnace and process are capable of further modification and change to meet varying requirements and conditions and I contemplate such changes and modifications as come within the spirit and scope of the appended claims.

I claim:

1. A metallurgical furnace having a hearth portion and a superposed shaft portion, and adjustable members for modifying the effective passage area between the shaft and hearth.

2. A metallurgical furnace having a hearth portion and a superposed shaft portion, and means located about the periphery of the lower end of the shaft for modifying the effective passage area between the shaft and hearth.

3. A metallurgical furnace having a hearth portion and a smaller superposed shaft portion connected to the upper portion of the hearth, a water cooled ring for supporting the shaft portion independently of the hearth, and means below the water cooled ring movable into and out of the lower end of the shaft to modify the effective passage area between the shaft and hearth.

HERMAN A. BRASSERT.